United States Patent [19]
Seydl et al.

[11] 3,937,757
[45] Feb. 10, 1976

[54] MOLDING COMPOSITIONS OF POLYBUTYLENE TEREPHTHALATE AND OLEFIN POLYMER

[75] Inventors: Wolfgang Seydl, Frankenthal; Erich Strickle, Mannheim, both of Germany

[73] Assignee: BASF Aktiengesellschaft, Ludwigshafen (Rhine), Germany

[22] Filed: Sept. 5, 1974

[21] Appl. No.: 503,522

[52] U.S. Cl. .......... 260/873; 260/42.18; 260/42.21; 428/458
[51] Int. Cl.² ........................................ C08L 67/06
[58] Field of Search ................................... 260/873

[56] References Cited
UNITED STATES PATENTS
3,364,281   1/1968   Saito et al............................ 260/873

Primary Examiner—Murray Tillman
Assistant Examiner—J. Ziegler
Attorney, Agent, or Firm—Johnston, Keil, Thompson & Shurtleff

[57] ABSTRACT

Molding compositions based on polybutylene terephthalate distinguished by improved tracking resistance and containing, based on the total weight of the molding composition, from 5 to 50% by weight of a polyolefin.

10 Claims, No Drawings

MOLDING COMPOSITIONS OF POLYBUTYLENE TEREPHTHALATE AND OLEFIN POLYMER

This application discloses and claims subject matter described in German patent application Ser. No. P 23 45 458.2, filed Sept. 9, 1973, which is incorporated herein by reference.

This invention relates to molding compositions based on polybutylene terephthalate.

Thermoplastic polyesters based on polybutylene terephthalate are becoming increasingly significant as starting materials for the manufacture of injection moldings. Polybutylene terephthalate, when used as an injection molding composition, has substantial advantages over other thermoplastic polyesters such as polyethylene terephthalate. In particular, polybutylene terephthalate is much simpler to use in injection molding techniques than polyethylene terephthalate. For example, it is possible to injection mold polybutylene terephthalate at a low temperature of from about 30° to 60°C to produce highly crystalline, dimensionally stable moldings in short cycle times. On account of the high rate of crystallization, even at low temperatures, no difficulty is encountered in removing the moldings from the molds. Furthermore, the dimensional stability of polybutylene terephthalate injection moldings is very good even at temperatures near or well above the glass temperature of polybutylene terephthalate.

In addition, injection moldings made of polybutylene terephthalate are distinguished by excellent mechanical properties. On account of its high degree of toughness, its good rigidity and its high surface hardness, this material has applications in the electrical industry, for example in electrical engineering and electronics.

In some applications, however, the not always satisfactory tracking resistance of the polybutylene terephthalate is a disadvantage. By tracking current we mean a current formed on the surface of an insulator on account of conductive impurities therein between two electrodes between which there is a potential difference. Tracking resistance, i.e. the ability of an insulating material to resist the formation of a tracking current, is becoming increasingly important in industry, for it has been found, when examining damaged electrical equipment, that the cause of the damage has not been a sudden short circuit but a tracking current acting over a long period.

It is thus an object of the invention to provide molding compositions based on polybutylene terephthalate which show improved tracking resistance.

According to the invention, this object is achieved with polybutylene terephthalate molding compositions containing, based on the total weight of the molding composition, from 5 to 50% by weight of a polyolefin.

The main component of the molding compositions of the invention is polybutylene terephthalate. Suitable polybutylene terephthalate is one having a relative viscosity of from 1.3 to 1.8 and preferably from 1.5 to 1.7, as measured on a 0.5% solution in a 3:2 w/w mixture of phenol and o-dichlorobenzene at 25°C. Polybutylene terephthalate is well known. It is manufactured, for example, by transesterification of terephthalic dialkyl esters derived from alcohols of from 1 to 8 carbon atoms, preferably dimethyl terephthalate, with butanediol-1,4, followed by polycondensation.

Polybutylene terephthalate which has been modified with up to 20% molar of other dicarboxylic acids or alcohols may also be used in the manufacture of the molding compositions of the invention. Suitable modifiers are for example aliphatic, cycloaliphatic or aromatic dicarboxylic acids. Examples thereof are adipic acid, azelaic acid, sebacic acid, dodecanodioic acid, cyclohexanodioic acid, isophthalic acid and naphthalenedioic acid.

Suitable alcoholic modifying agents are in particular aliphatic and cycloaliphatic glycols of from 2 to 10 carbon atoms, such as ethylene glycol, propylene glycol, hexamethylene glycol, neopentyl glycol, diethylene glycol and 1,4-bis-hydroxy-methylcyclohexane and also bisphenol A.

The properties of the material may also be improved by adding small amounts of trifunctional or polyfunctional cross-linkers thereto, e.g. trimethylolpropane and trimesic acid, such addition being effected by condensation.

To improve the tracking resistance of the polybutylene terephthalate, from 5 to 50% by weight, based on the total weight of the molding composition, of a polyolefin is added thereto. Suitable polyolefins have an X-ray crystallinity at 25°C of more than 15% by weight. Suitable polyolefins are for example polyethylene terephthalate, polypropylene, polymers of butene-1 and butene-2, poly-4-methylpentene-1- and copolymers of ethylene and propylene, ethylene and butenes and ethylene and 4-methyl-pentene-1. Also suitable are copolymers of ethylene with other ethylenically unsaturated compounds such as vinyl esters derived from saturated carboxylic acids of from 2 to 6 carbon atoms, acrylates and methacrylates of alcohols of from 1 to 20 carbon atoms, acrylic acid, methacrylic acid, fumaric acid, maleic acid and itaconic acid and the esters of said carboxylic acids. It is also possible to use ethylene copolymers containing polymerized units of two or more of said comonomers, for example copolymers of ethylene, vinyl acetate and acrylic acid, copolymers of ethylene, acrylic acid and ethyl acrylate, and copolymers of ethylene, acrylic acid and 2-ethylhexyl acrylate. It is also possible to use two or more of said polyolefins in manufacturing the molding compositions of the invention. For example, suitable are mixtures of high-pressure polyethylene and an ethylene/vinyl acetate copolymer in a ratio of from 1:1 to 5:1 by weight, mixtures of high-pressure and low-pressure polyethylenes in a ratio of 99:1 to 1:99 by weight and mixtures of high-pressure and low-pressure polyethylenes together with ethylene/acrylic acid/acrylate copolymers. The molecular weight (determined by light scatter) of the polyolefins is at least 20,000. The polyolefins have a melt index of from 0.01 to 100 as measured at a temperature of 190°C and under a load of 2.16 kg according to ASTM D 1238-65 T. We prefer to use a polyethylene having a density of from 0.940 to 0.965 g/cm$^3$ and a melt index (190°C/2.16 kg) of from 1 to 20 g/10 min., and copolymers of ethylene and vinyl acetate and copolymers of ethylene and acrylates. The ethylene copolymers contain at least 50% by weight of ethylene units. The comonomer content of the ethylene copolymers is generally from 3 to 40% by weight. The molding compositions of the invention contain said polyolefins preferably in amounts of from 10 to 30% by weight. The molding compositions of the invention may contain further additives such as reinforcing agents and fillers, e.g. glass fibers, glass spheres, asbestos, chalk and lime, and dyes, antistatic agents, pigments, stabilizers counteracting thermal and thermo-oxidative degradation and processing auxiliaries ensuring trouble-free extrusion and injection molding, in the usual amounts.

The molding compositions of the invention are preferably prepared by thorough mixing in the melt. We prefer to mix granular polybutylene terephthalate with one or more of said polyolefins, whereupon the mixture is melted in an extruder and homogenized. The homogeneous mixture is then extruded and granulated. Mixing is usually carried out at temperatures between 230° and 280°C. Preparation of the molding compositions of the invention may be suitably carried out in equipment commonly used in the plastics industry, for example extruders and kneaders.

The molding compositions of the invention are used for the manufacture of materials of high tracking resistance.

These mixtures are distinguished by a much higher tracking resistance than pure polybutylene terephthalate. Whereas moldings of pure polybutylene terephthalate provide a short circuit at voltages as low as about 420 volts (as tested according to DIN 53,480, KB method, test solution A), the corresponding value for moldings of the invention is at or considerably above 600 volts.

Furthermore, the polybutylene terephthalate/polyolefin mixtures are distinguished by very good processing properties equivalent to those of pure polybutylene terephthalate and also by good mechanical properties. Injection molding procedures give highly crystalline and dimensionally stable moldings of good surface properties and favorable sliding friction properties at low molding temperatures of from about 30° to 60°C.

The invention is further described with reference to the following Examples in which the parts are by weight. The tracking resistance test used is that laid down in DIN 53,480 on injection-molded round discs having a diameter of 80 mm and a thickness of 4 mm according to the KB method using the test solution A.

EXAMPLES 1 TO 7

Various quantities, as given in the Table below, of granular polybutylene terephthalate having a relative viscosity of 1.625 (as measured on a 0.5% solution in a 3:2 w/w phenol/o-dichlorobenzene mixture at 25°C) and various amounts of polyolefins are intimately mixed, melted in an extruder and homogenized. The maximum temperature in the extruder is 265°C. The homogeneous mixture is extruded and granulated after passing through a water bath. The well-dried granules are then injection molded to round discs having a diameter of 80 mm and a thickness of 4 mm. The results obtained are listed in the Table below, where they are compared with the tracking resistance of a disc of pure polybutylene terephthalate prepared under similar conditions.

TABLE

| Ex. | Composition Polybutylene terephthalate (parts) | Polyolefin (parts) | Tracking resistance (DIN 53,480, KB method, Test solution A) |
|---|---|---|---|
| 1 | 90 | A. 10 | KB > 600 |
| 2 | 80 | B. 20 | KB > 600 |
| 3 | 80 | C. 20 | KB > 600 |
| 4 | 70 | D. 30 | KB > 600 |
| 5 | 80 | E. 20 | KB > 600 |
| 6 | 75 | F. 25 | KB > 550 |
| 7 | 90 | G. 10 | KB > 600 |
| Comp. test | 100 | — — | KB 420 |

Polyolefins:
A. polyethylene, $d$ 0.953 g/cm$^3$, M.I. 2.1 g/10 min (190°C/2.16 kg)
B. polyethylene, $d$ 0.917 g/cm$^3$, M.I. 1.4 g/10 min (190°C/2.16 kg)
C. polyethylene, $d$ 0.923 g/cm$^3$, M.I. 1.7 g/10 min (190°C/2.16 kg)
D. polyethylene, $d$ 0.943 g/cm$^3$, M.I. 6.2 g/10 min (190°C/2.16 kg)
E. polypropylene, intrinsic viscosity = 2.5
F. poly-4-methylpentene-1, intrinsic viscosity = 2.1
G. copolymer of ethylene and vinyl acetate containing 12% of vinyl acetate, M.I. 4.4 g/10 min (190°C/2.16 kg).

The above intrinsic viscosities are determined at 130°C in decalin.

We claim:

1. Molding compositions based on polybutylene terephthalate and containing, based on the total weight of the molding composition, from 5 to 50% by weight of an olefin polymer selected from the group consisting of polyolefins and olefin polymers containing at least 50% by weight of olefin units, said olefin polymer having a melt index of from 0.01 to 100 as measured at a temperature of 190°C 2nd under a load of 2.16Kg.

2. Molding compositions as set forth in claim 1 wherein the amount of olefin polymer is from 10 to 30% by weight based on the total weight of the molding composition.

3. Molding compositions as set forth in claim 1 wherein the polybutylene terephthalate has a relative viscosity of from 1.3 to 1.8 as measured on a 0.5% solution in a 3:2 w/w mixture of phenol and o-dichlorobenzene at 25°C.

4. Molding compositions as set forth in claim 1 wherein the polybutylene terephthalate has a relative viscosity of from 1.5 to 1.7 as measured on a 0.5% solution in a 3:2 w/w mixture of phenol and o-dichlorobenzene at 25°C.

5. Molding compositions as set forth in claim 1 wherein said polybutylene terephthalate is modified with dicarboxylic acids selected from the group consisting of adipic acid, azelaic acid, sebacic acid, dodecanodioic acid, cyclohexanodioic acid, isophthalic acid and naphthalenedioic acid in amounts of up to 20% molar.

6. Molding compositions as set forth in claim 1, wherein said polybutylene terephthalate is modified with up to 20% molar of aliphatic or cycloaliphatic glycols of from 2 to 10 carbon atoms.

7. Molding compositions as set forth in claim 1 wherein the olefin polymers have an X-ray crystallinity at 25°C of more than 15% by weight.

8. Molding compositions as set forth in claim 1 wherein the polyolefin is polyethylene having a density of from 0.940 to 0.965 g/cm$^3$ and a melt index of from 1 to 20 g/10 min as measured at a temperature of 190°C and under a load of 2.16 kg.

9. Molding compositions as set forth in claim 1 wherein the olefin polymer is selected from the group consisting of copolymers of ethylene and vinyl acetate and copolymers of ethylene and acrylates wherein the copolymers contain at least 50% by weight of ethylene units.

10. Molding compositions as set forth in claim 1 wherein the olefin polymers have a molecular weight of at least 20,000.

* * * * *

UNITED STATES PATENT AND TRADEMARK OFFICE
CERTIFICATE OF CORRECTION

PATENT NO. : 3,937,757
DATED : February 10, 1976
INVENTOR(S) : Wolfgang Seydl et al.

It is certified that error appears in the above—identified patent and that said Letters Patent are hereby corrected as shown below:

In the Heading, insert -- Foreign Application Priority Date   September 8, 1973   Germany   P 23 45 458.2 --

Signed and Sealed this

Fourth Day of January 1977

[SEAL]

Attest:

RUTH C. MASON
*Attesting Officer*

C. MARSHALL DANN
*Commissioner of Patents and Trademarks*